Feb. 20, 1951  C. L. CUCCIA  2,542,797
MICROWAVE COUPLING SYSTEM AND APPARATUS
Filed June 14, 1947  7 Sheets-Sheet 1
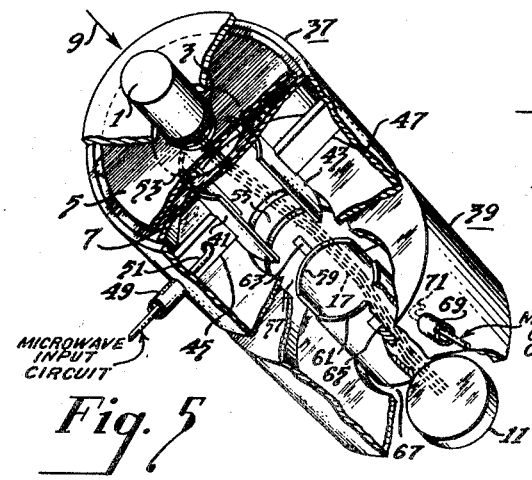
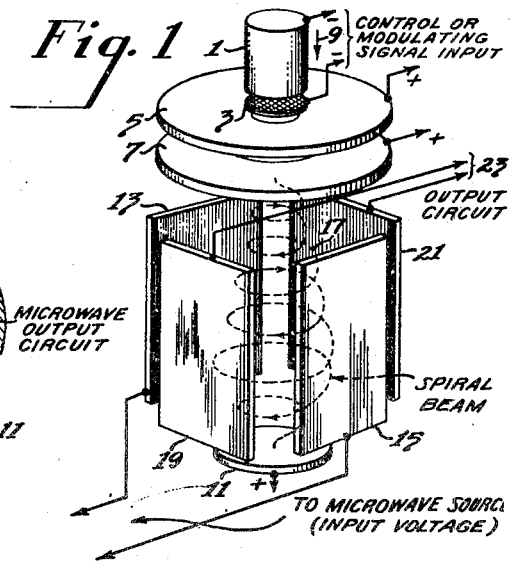
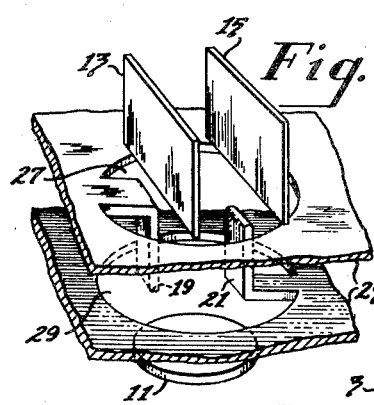
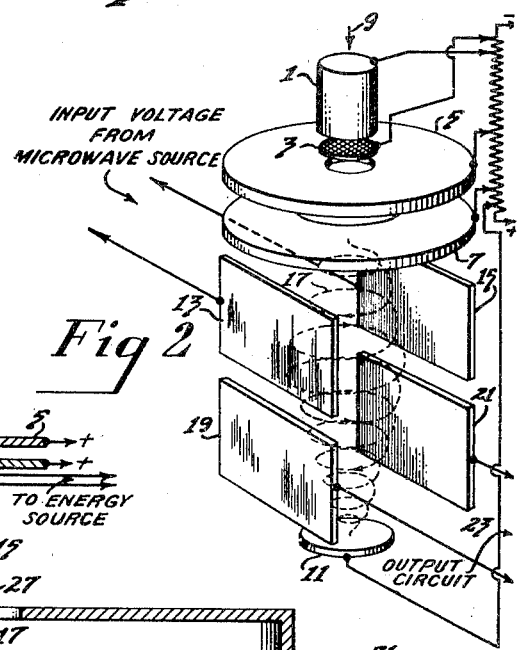
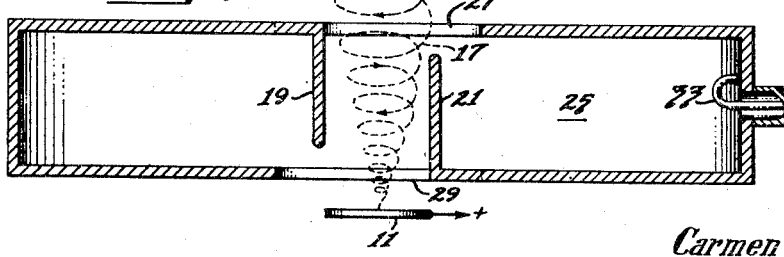
INVENTOR.
Carmen L. Cuccia
William A. Zalesak
BY  ATTORNEY Feb. 20, 1951     C. L. CUCCIA     2,542,797
MICROWAVE COUPLING SYSTEM AND APPARATUS
Filed June 14, 1947     7 Sheets-Sheet 2
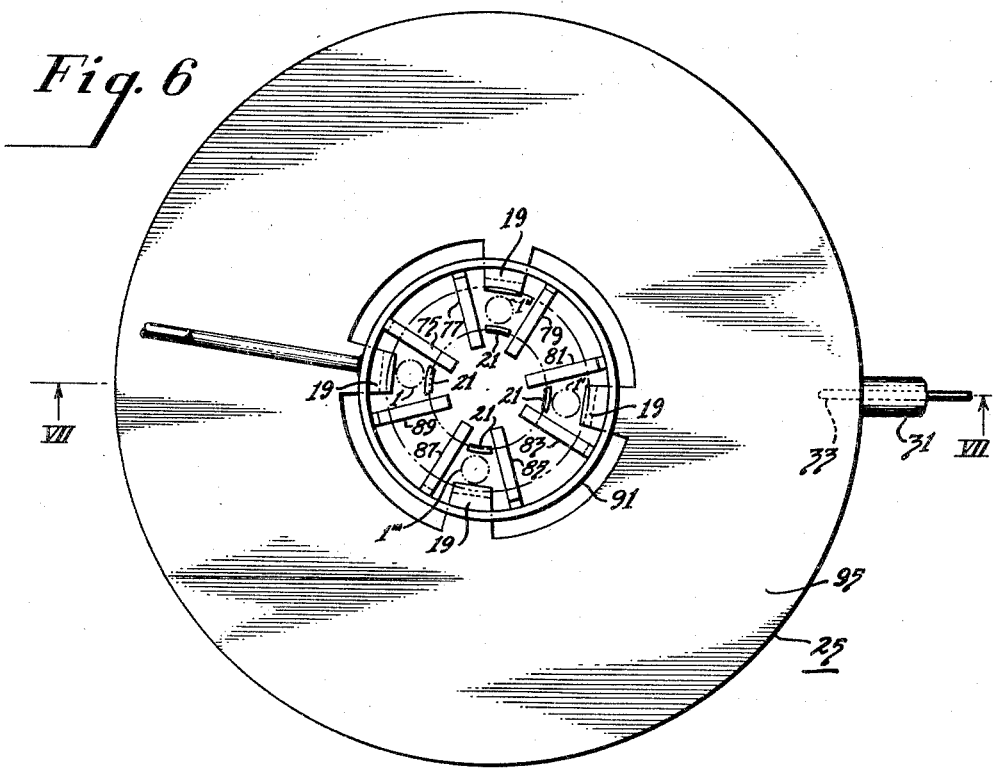
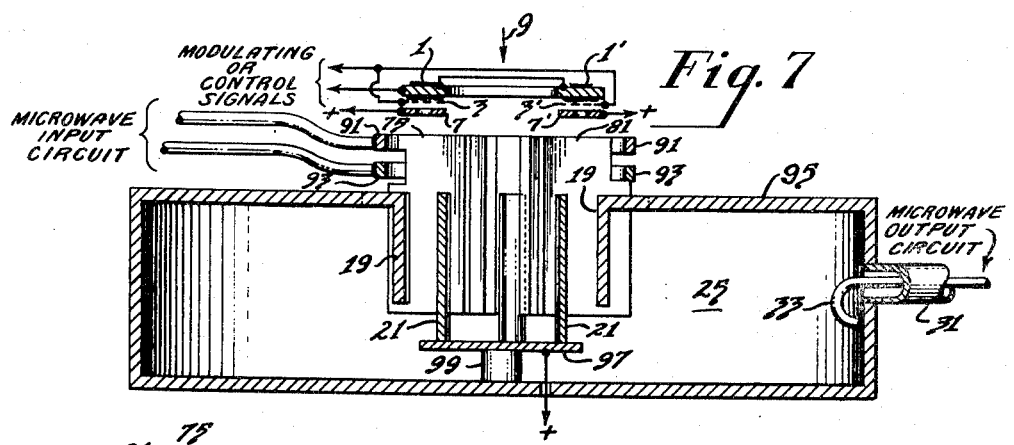
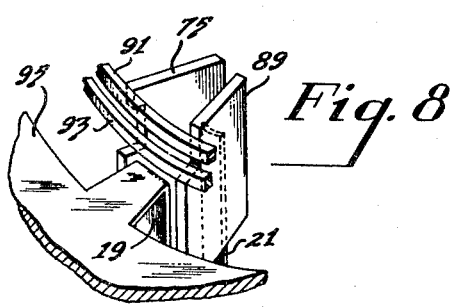
INVENTOR.
Carmen L. Cuccia
William A. Ozalesak
BY    ATTORNEY

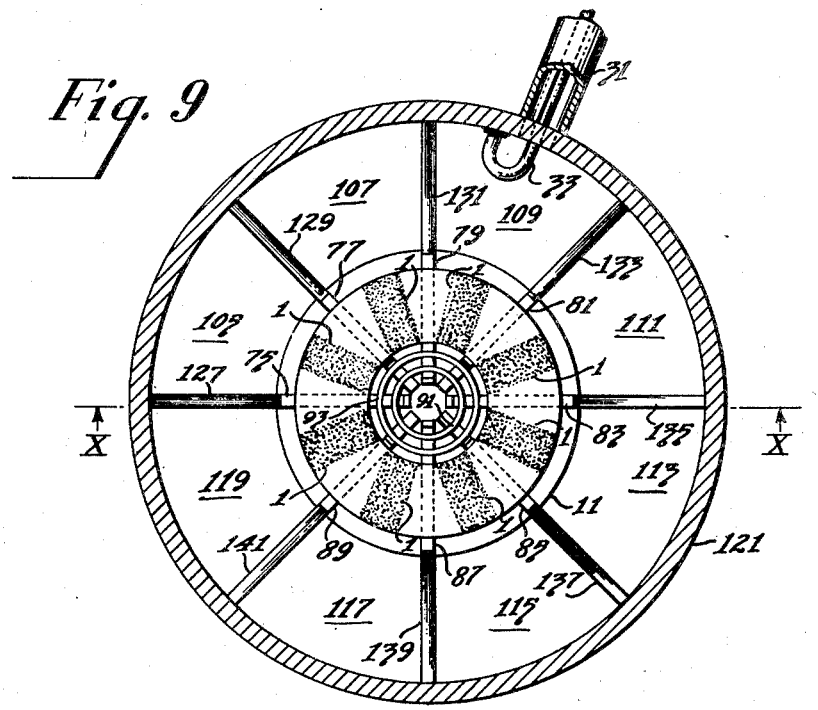
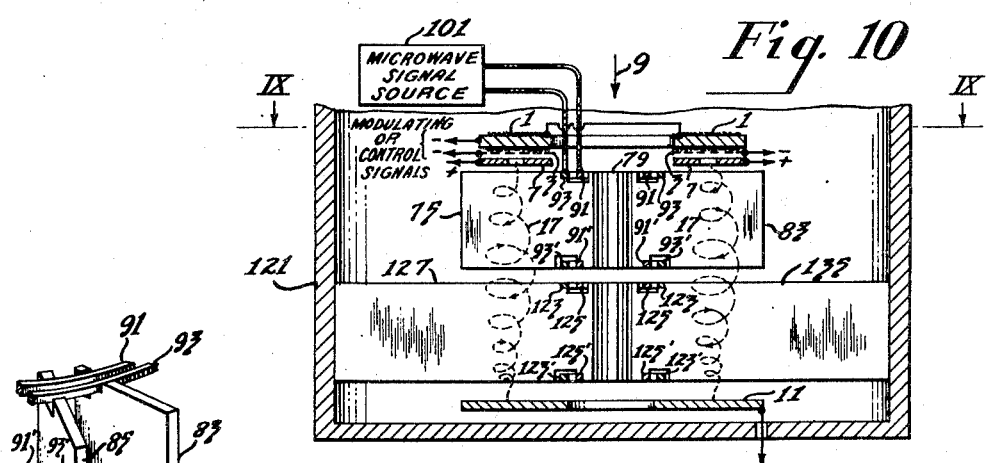
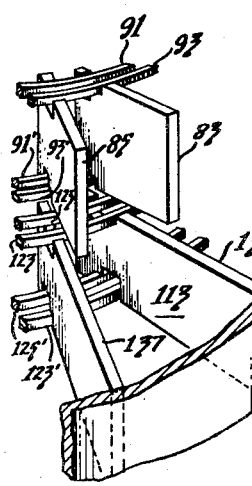

Feb. 20, 1951     C. L. CUCCIA     2,542,797
MICROWAVE COUPLING SYSTEM AND APPARATUS
Filed June 14, 1947     7 Sheets-Sheet 4
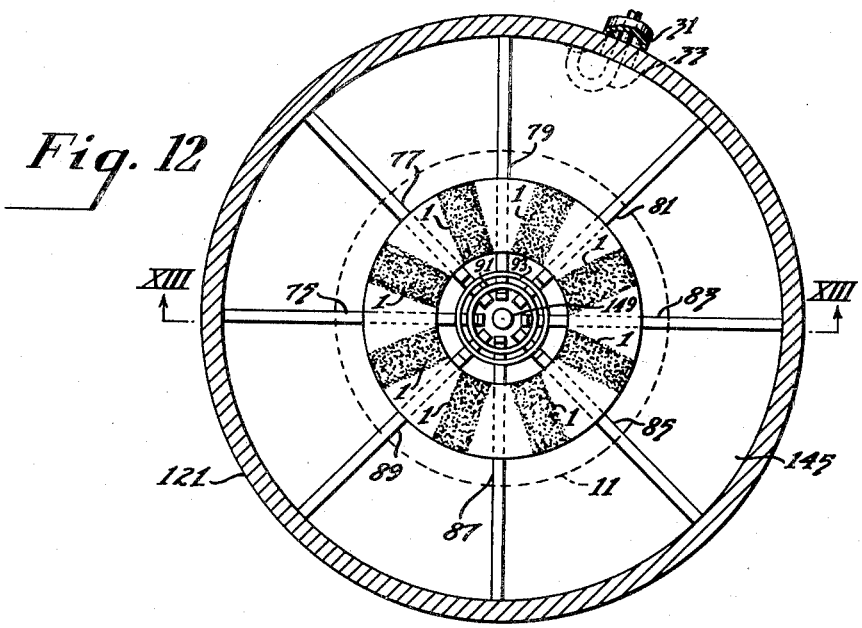
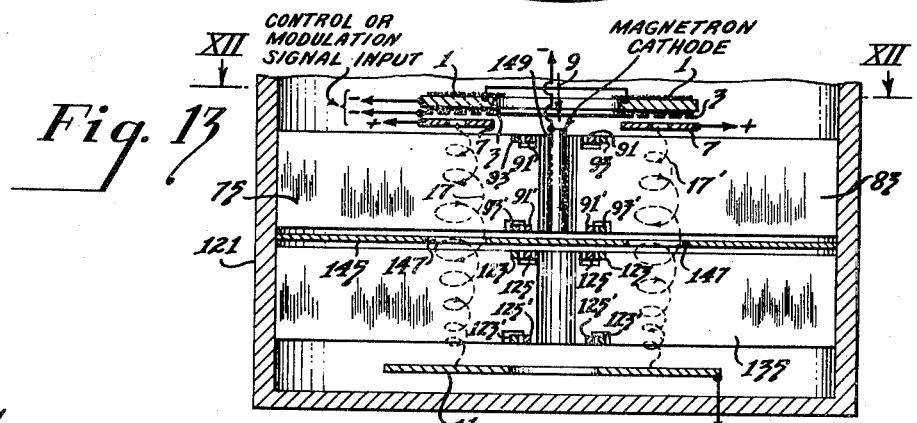
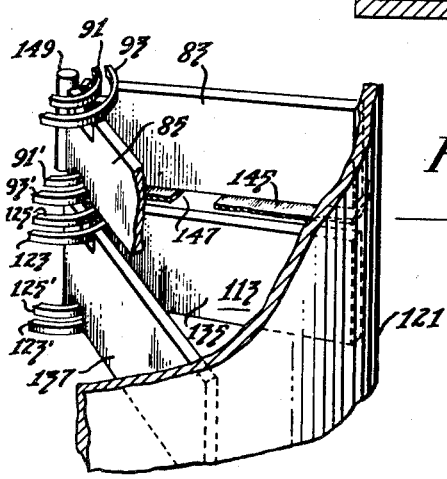
INVENTOR.
Carmen L. Cuccia
William A. Zalesak
BY     ATTORNEY

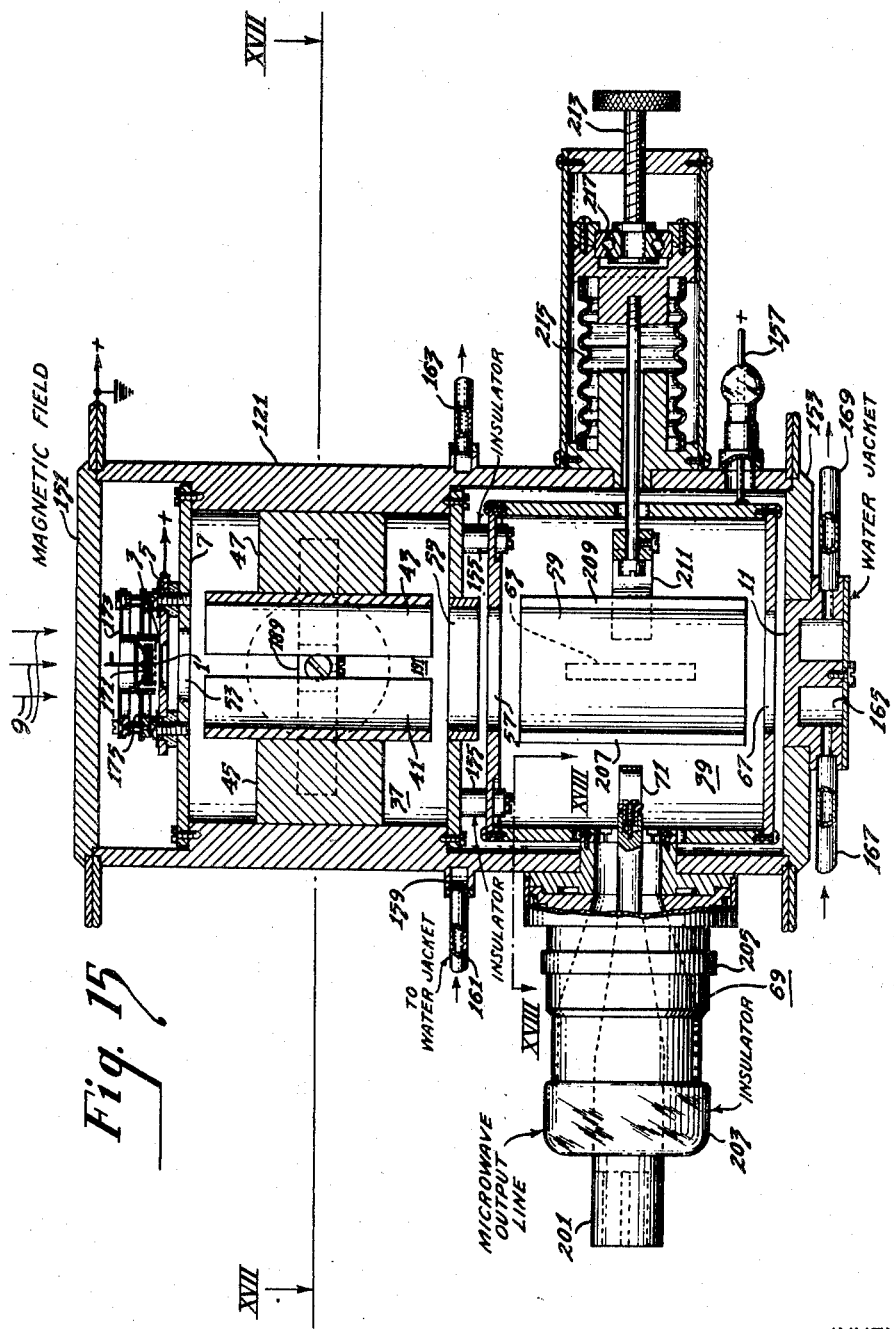

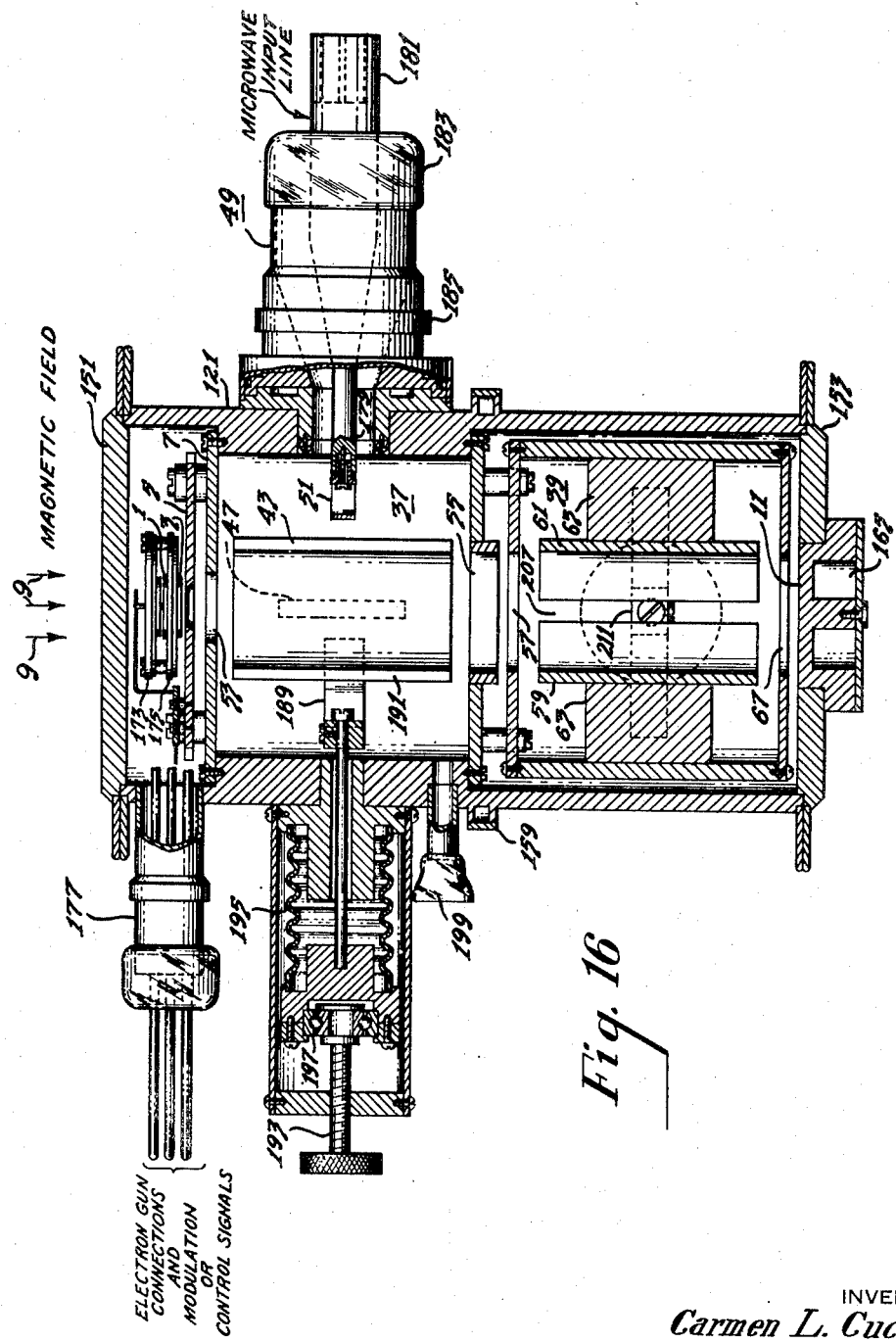

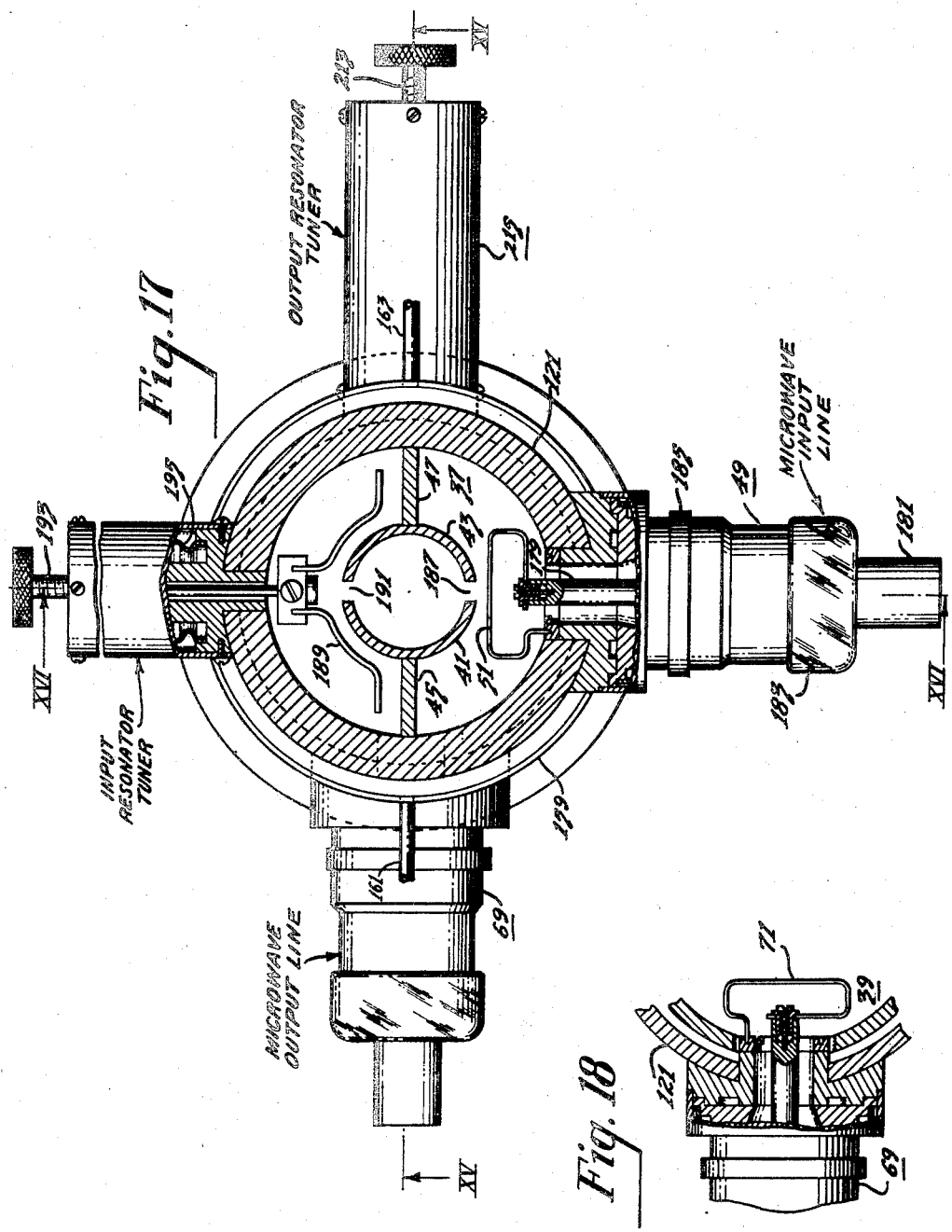

Patented Feb. 20, 1951

2,542,797

UNITED STATES PATENT OFFICE 2,542,797

MICROWAVE COUPLING SYSTEM AND APPARATUS

Carmen L. Cuccia, Princeton, N. J., assignor to Radio Corporation of America, a corporation of Delaware Application June 14, 1947, Serial No. 754,756

43 Claims. (Cl. 332—54)

This invention relates generally to microwave coupling systems and apparatus and more particularly to a system employing an electron discharge device utilizing a spiral electron beam for amplitude modulating microwave energy applied to a load circuit.

Briefly, the invention contemplates the use of an electron discharge device having an electron beam gun, wherein the electron beam is projected through a transverse microwave electric field energized at the operating microwave frequency. A constant coaxial magnetic field is applied to the electron beam. As the electron beam passes through the transverse microwave electric field, it absorbs microwave energy therefrom, causing the individual electrons to traverse spiral paths having radii proportional to the energy absorbed from the microwave field and having axial velocities proportional to the axial electron beam potential. The spirally traveling electrons form an electron beam in the shape, for example, of a hollow cone, since all of the electrons at any instant lie on the directrix of the cone and are similarly phased. The spiral or cone-directrix electron beam is projected through a cavity resonator, or between a pair of capacitive electrodes which may be coupled into a cavity resonator, whereby the spiral beam delivers microwave energy to the electrodes or to the resonator which is tuned to the operating microwave frequency. As energy is abstracted from the spiral electron beam, the radii of the spirally traveling electrons comprising the beam are reduced as a function of the energy abstraction and corresponding microwave energy may be derived from the coupling electrodes or cavity resonator. After delivering microwave energy to the output coupling elements, the beam is collected by a positively-biased collector electrode.

By applying modulating signals or control potentials to a control grid forming a part of the electron beam gun, the intensity of the electron beam may be varied as a function of the applied control voltages. As the electron beam intensity is varied, the effective coupling factor between the input and output microwave circuits is correspondingly varied, thus providing amplitude modulation or coupling control of the microwave signals. Similarly the accelerating potentials applied to the electron beam may be varied by modulation signals or control potentials in order similarly to vary the beam energy and thus control the effective microwave coupling between input and output circuits. The input and output microwave field elements may comprise plane or arcuate pairs of electrodes or cavity resonators which may include such electrode elements. The electron beam gun preferably should be of the screen grid type including a control grid. If desired, the input and output field elements may be shielded from each other.

Among the objects of the invention are to provide improved methods of and means for modulating the amplitude of microwave oscillations. Another object is to provide an improved method of and means for controlling the degree of coupling between two microwave circuits. An additional object is to provide improved methods of and means for controlling the coupling between a microwave generator and a load circuit in response to the magnitudes of control or modulating signals. A further object of the invention is to provide an improved method of and means for utilizing the coupling between an electron beam of varying radius and transverse microwave electric fields through which the electron beam is projected. A still further object of the invention is to provide an improved microwave electron discharge coupling device wherein an electron beam is projected through a transverse microwave electric field and subjected to an axial constant magnetic field and wherein the electron beam absorbs microwave energy from the transverse microwave electric field, said absorbed energy providing radial motion of the electrons of said beam and wherein said spirally-traveling electrons induce in and deliver microwave power to a second microwave circuit, the coupling between said circuits being determined by the axial energy of the electron beam. Another object of the invention is to provide an improved microwave amplitude modulation device wherein a grid controlled electron beam device projects an axial electron beam through an axial constant magnetic field and a transverse microwave electric field, the projected electrons absorb energy from said transverse microwave field and deliver energy to an output microwave circuit coupled to said beam, the coupling factor between said transverse microwave input field and said microwave output circuit being determined by potentials applied to the grid of the electron beam generating means. A still further object of the invention is to provide an improved microwave coupling system wherein an electron beam couples a pair of microwave field devices, and the coupling coefficient is determined by the initial energy, the density, the velocity, or the reactive effects of said electron beam on said field devices.

The theory of operation of the device may be stated in terms of the interactions between the electron beam and the fields of the input and output signal electrodes or the cavity resonators in the embodiments of the invention wherein they are axially displaced. To avoid unnecessary mathematical complexity in the analysis, the transverse electric field strengths in the input and output regions are assumed to be equal. A transverse electric field is produced between the input microwave signal electrodes which alternates with a frequency.

$$f_0 = \frac{1}{2\pi}\frac{e}{m}H \qquad (1)$$

An electron directed through the space between the input microwave signal electrodes with an initial velocity due to an accelerating beam potential $V_{b_1}$ is subjected to interaction with the transverse electric field $E_{rf}$ and the axial constant magnetic field H. The fundamental relations governing the motion of the beam electrons in this region are $$\begin{cases} m\ddot{x} = -eE_{rf} - eH\dot{y} \\ m\ddot{y} = eH\dot{x} \\ m\ddot{z} = 0 \end{cases} \qquad (2)$$

wherein H is the strength of the constant magnetic field in gausses, $E_{rf}$ is the transverse electric field $$\omega_0 = \frac{eH}{m}$$

is the angular velocity of the electron due to the particular field H, $e$ is the charge of an electron, $m$ is the mass of an electron, $\dot{x}$ is the transverse velocity of the electron parallel to the radio frequency field and $\ddot{x}$ is the corresponding acceleration, $\dot{y}$ is the transverse electron velocity perpendicular to the radio frequency field and $\ddot{y}$ is the corresponding acceleration. Thus for conditions $$\begin{cases} E_{rf} = Ee^{j\omega t} \\ \text{at } t=t_0, \ \ddot{x}=\dot{x}=0 \end{cases}$$

$$\dot{x} = \tfrac{1}{2}e/m E\left[(t-t_0)e^{j\omega t} + \frac{1}{2j\omega_0}(-e^{j\omega t} + e^{j\omega_0(2t_0-t)})\right] \qquad (3)$$

The induced current in the electrodes due to the velocity $\dot{x}$ of the electrons is $$Ii = ne\cdot\frac{\dot{x}}{d} \qquad (4)$$

where $n$ is the number of electrons and $d$ is the distance between the electrodes. From Equations 3 and 4 may be obtained three fundamental equations for the primary or input microwave signal portion of the system. The microwave power abstracted by the electron beam in passing through the microwave electric field is $$P = \tfrac{1}{16}v_a^2\left(\frac{l_1}{d}\right)^2\frac{I_0}{V_{b_1}} \quad \text{(watts)} \qquad (5)$$

The deflection of the electron beam after traversing a distance $l_1$ along the electron beam axis $z$ is $$x_d = 2.36\frac{El_1}{V_{b_1}^{1/2}f_0} \quad \text{(centimeters)} \qquad (6)$$

wherein all distances are expressed in centimeters. The effective electron beam resistance due to absorption of energy from the microwave field is $$R_0 = \frac{V_a^2}{2P} = 8\frac{d_1^2}{l_1^2}\frac{V_{b_1}}{I_0} \quad \text{(ohms)} \qquad (7)$$

wherein $I_0$ is the electron beam current in amperes, $V_a$ is the alternating peak voltage between the microwave field electrodes, $V_{b_1}$ is the electron beam voltage, $f_0$ is the operating frequency in megacycles, $l_1$ is the axial distance in centimeters traversed by the electron through the microwave electric field, $x_d$ is the distance in centimeters in which the electron is deflected in the direction of the electric field, and $d$ is the separation in centimeters of the beam deflecting microwave field electrodes.

From foregoing it is seen that the individual electrons of the deflected electron beam travel spiral paths having radii proportional to the energy abstracted by the electron in passing through the microwave electric field while the complete electron beam comprises a hollow cone in which all of the electrons at any instant lie upon the cone directrix. At any instant, by integration of $\dot{x}$ and $\dot{y}$ it is seen that $$\begin{cases} x = \tfrac{1}{2}e/m\dfrac{E}{\omega_0}(t_0-t)e^{j\omega_0 t} \\ y = \tfrac{1}{2}e/m\dfrac{E}{j\omega_0}(t_0-t)e^{j\omega_0 t} \end{cases} \quad \phi = \tan^{-1}x/y \qquad (8)$$

Equations 8 indicate that for any instant, regardless of transit time, the angle $\phi$ described by all of the electrons is the same. Thus, although each electron travels on a spiral path as it proceeds along the electron beam $z$ axis, all of the electrons at any instant lie on the cone directrix which rotates with an angular velocity $\omega_0$.

After traversing the transverse microwave field and before entering the space between the output energy abstracting electrodes, no transverse electric field affects the electrons and they are subjected only to the axial D.-C. accelerating field and to the constant magnetic field. Thus, the equations of motion of the electron beam in this intercavity space are $$\begin{cases} m\ddot{x} = -He\dot{y} \\ m\ddot{y} = He\dot{x} \\ m\ddot{z} = 0 \end{cases} \qquad (9)$$

At $t=t_0$ (the time of the entrance of the electrons into the intercavity space)

$$\begin{cases} x = r_0 e^{j\omega_0 t} \\ y = jr_0 e^{j\omega_0 t} \end{cases} \qquad (10)$$

where $\dot{x}=\dot{y}=0$, $r=\sqrt{x_0^2+y_0^2}$ and $r_0$ is the radius of the electron beam. Solving Equation 9 under the conditions defined in Equation 10 indicates that $$\dot{x} = -\omega_0 r_0 e^{j(\omega_0 t_0 + \omega_0(t-t_0))} \qquad (11)$$

Equation 11 indicates that the radius of rotation of the electron beam will not vary as it passes through the intercavity space with an angular velocity $\omega_0$ and thus all electrons comprising the beam will lie on the line directrix of a cylinder of a diameter $2r_0$.

As the rotating cylindrical electron beam enters the output cavity resonator, or the space between the output energy abstracting electrodes, it induces a transverse electric field $-Ee^{j\omega_0 t}$ between the output electrodes of proper phase so that the electron beam delivers its rotational energy to this field and the microwave energy derived by the beam from the input transverse microwave electric field is thus delivered to the output microwave abstracting electrodes or cavity resonator. This output radio frequency voltage is produced on the output electrodes by the currents induced therein by the rotating electron beam. If all of the radio frequency energy is abstracted from the electron beam, the electrons comprising the beam will lose all of their transverse components of motion, and the beam thus will gradually reduce in diameter in the form of a hollow inverted cone. After the radio frequency energy has been abstracted from the rotational components of the electron beam, the remaining axial beam is collected by a suitably positively biased collector electrode.

The equations of motion for the electrons in the output cavity resonator or in the space between the output energy abstracting electrodes are identical to Equations 2 except that the boundary conditions are $$\begin{cases} \dot{x} = \omega_0 r_0 e^{j\omega_0 t} \\ E_{rf} = -E e^{j\omega_0 t} \end{cases} \quad (12)$$

If the electron enters the output cavity at $t=t_0$, the solution for $\dot{x}$ is $$v_x = \frac{j\omega_0 r_0}{2}[e^{j\omega_0 t} + e^{-j\omega_0 t} e^{j2\omega_0 t}] -$$

$$\frac{1}{2}\frac{e}{m}\frac{E}{j\omega_0}\left[e^{j\omega_0 t} - \frac{1}{2}e^{-j\omega_0 t}e^{j2\omega_0 t}\right]$$

$$\dot{x} = j\left[\omega_0 r_0 - \frac{e}{m}E(t-t_0)\right]e^{j\omega_0 t} -$$

$$j\frac{e}{m}E\frac{\sin \omega_0(t-t_0) e^{j\omega_0 t_0}}{2\omega_0} \quad (13)$$

From this equation of electron rotational velocity, the microwave power given up by the rotating beam to the secondary space fields after it travels a distance $l_2$ therethrough for a steady state condition is $$P(l_2) = P_i - \frac{E^2(l_{2c} - l_2)^2 I_0}{16 V_{b_2}} \quad (14)$$

where $P_i$ is the microwave power abstracted by the electron beam from the input transverse microwave electric field $$l_{2c} = l_1 \sqrt{\frac{V_{b_2}}{V_{b_1}}}$$

and $V_{b_2}$ is the accelerating beam potential for the second cavity. For optimum energy transfer efficiency the second term should be equal to $P_i$ when $l_2$ is zero.

The load resistance R of the system will determine the rate at which the energy is abstracted from the beam, and as a function of the current induced by the $x$ motion of the rotating beam, is, for optimum transfer efficiency, equal to the secondary space beam resistance $R_{\infty}$ where $$R_{\infty} = 8\left[\frac{d_2}{l_2}\right]^2 \frac{V_{b_2}}{I_0} \text{ (ohms)} \quad (15)$$

Continuing the analysis, the energy transfer efficiency of the electron microwave electron coupler described heretofore is $$\eta = \frac{P_0}{P_i} = 4\frac{V_{b_1}}{V_{b_2}}\frac{K}{\left[1 + K\frac{V_{b_1}}{V_{b_2}}\right]^2} \quad (16)$$

where $$K = \frac{R_{\infty}}{R}$$

$P_i$ is the input power, $P_0$ is the output power, $V_{b_1}$ is the electron beam voltage in the input coupling space and $V_{b_2}$ is the electron beam voltage in the output energy abstracting space.

The invention will be described in greater detail by reference to the accompanying drawings which disclose typical embodiments and modifications of apparatus adapted to the amplitude modulation or coupling control of microwave signals coupled between two microwave circuits or cavity resonator devices. Referring to the drawings, Figure 1 is a schematic diagram of a first embodiment of the invention utilizing perpendicularly disposed input and output microwave coupling elements arranged in quadrantal relation with respect to an electron beam projected therethrough, Figure 2 is a schematic diagram of a second embodiment of the invention utilizing parallel disposed input and output microwave electrodes successively coupled to an electron beam projected therethrough, Figure 3 is a cross-sectional, elevational, partially schematic view of a modification of said second embodiment of the invention, Figure 4 is a fragmentary, perspective view of the device of Fig. 3, Figure 5 is a partially sectioned, perspective view of a third embodiment of the invention utilizing cavity resonator input and output microwave coupling elements, Figure 6 is a plan view of a second modification of said second embodiment of the invention, Figure 7 is a cross-sectional, elevational view taken along the section line VII—VII of Fig. 6, Figure 8 is a fragmentary perspective view of a portion of the device shown in Figs. 6 and 7, Figure 9 is a cross-sectional plan view, taken along the section line IX—IX of Fig. 10, of a third modification of said second embodiment of the invention, Figure 10 is a cross-sectional, elevational, partially schematic view taken along the section line X—X of Fig. 9, Figure 11 is a fragmentary perspective view of a portion of the device shown in Figs. 9 and 10, Figure 12 is a cross-sectional plan view taken along the section line XII—XII of Fig. 13 of a further modification of said second embodiment of the invention, Figure 13 is a cross-sectional, elevational view taken along the section line XIII—XIII of Fig. 12, Figure 14 is a fragmentary perspective view of a portion of the device shown in Figs. 12 and 13, Figure 15 is a cross-sectional, elevational view, taken along the section lines XV—XV of Fig. 17, of a preferred modification of said third embodiment of the invention, Figure 16 is a cross-sectional, elevational view taken along the section line XVI—XVI of Fig. 17 of said preferred modification of said third embodiment of the invention, Figure 17 is a plan cross-sectional view taken along the section line XVII—XVII of Fig. 15, and Figure 18 is a fragmentary, partially cross-sectional view, taken along the section line XVIII—XVIII of Fig. 15, of a portion of the device shown in Figs. 15, 16 and 17. Similar reference characters are applied to similar elements throughout the drawings.

Referring to Figure 1 of the drawings, the simplest embodiment of the invention includes an evacuated envelope, not shown, enclosing a thermionic cathode 1, a control grid 3, a screen grid 5 and a centrally apertured anode 7 comprising a grid controlled electron beam gun. The intensity of the electron beam emitted by the cathode is controlled by suitable control and bias potentials applied between the cathode 1 and the control grid 3. An axial, constant intensity, magnetic field indicated by the arrow 9 is applied to the device from an external permanent magnet or electromagnet, not shown. Suitable positive potentials are applied to the screen grid 5 and the apertured anode 7 to provide the desired electron beam axial velocity. A collector electrode 11, which also is positively biased, attracts and collects the electron beam at the lower portion of the tube. A microwave signal source, not shown, is connected across a pair of plane, parallel-disposed electrodes 13, 15 disposed on opposite sides of the electron beam axis. If desired, the electrodes 13, 15 may be of any other desired conformation and arrangement to provide the desired microwave field distribution. The microwave signals applied thereto establish a microwave electric field transverse to the electron beam axis. As the electron beam passes between the input microwave signal electrodes 13, 15, the transverse electric field therebetween delivers energy to the electron beam causing the individual electrons to spiral as indicated by the dash line 17.

The radii of the electron paths are dependent upon the rotational energy absorbed by the electrons. Since all of the electrons have substantially the same initial electron energy and velocity, at any instant, they will lie upon the directrix of, for example, a hollow cone. A pair of output microwave electrodes 19, 21 are disposed on opposite sides of the axis of the electron beam 17 perpendicular to the input electrodes 13, 15. The spirally traveling electrons passing between the output electrodes 19, 21 will induce thereon microwave potentials of the input frequency. A load circuit 23 connected to the output electrodes 19, 21 will absorb microwave energy from the electron beam, causing a reduction in the radii of the electron paths. If substantially all of the input microwave signal energy is absorbed by the load circuit 23, the electron beam will be reduced to substantially its original diameter, and the remaining axial electron energy will be collected by the collector electrode 11. With the output microwave electrodes 19, 21 in the same relative axial position as the input electrodes 13, 15, the output electrodes will distort to some extent the transverse microwave electric field between the input electrodes 13, 15, thereby producing an undesired microwave field component between the output electrodes. However, the spiral beam action will occur as described heretofore and substantial microwave energy may be effectively transferred from the input to the output electrode circuits.

The degree of coupling between input and output electrode circuits will depend upon the initial energy of the electron beam entering the transverse microwave electric field. This initial electron energy is determined by the relative potentials applied to the electron gun elements and to the collector electrode. The sources of bias potentials for the gun and collector electrodes may be adjustable, if desired. The electron beam intensity, and hence the electron beam initial energy may be most readily controlled by applying modulation or control potentials between the cathode 1 and the control electrode 3.

The structure of Figure 2 essentially differs from that of Fig. 1 in that the input and output microwave electrodes are parallel disposed, one pair above the other, on opposite sides of the electron beam axis, and an adjustable voltage divider is provided for individually varying the control potentials applied to the electron gun electrodes and to the collector electrode. The structure of the device shown in Fig. 2 is preferable to that of the device illustrated in Fig. 1 for the reason that interaction is substantially eliminated between the input and output electrode circuits. As the electron beam 17 passes between the input microwave electrodes 13, 15, the electrons are caused to spiral in response to the rotational microwave energy absorbed from the transverse microwave electric field. In the axial region between the input and output microwave electrodes, the electron beam assumes the form of a hollow cylinder in which all of the individual electrons lie at any instant upon the directrix thereof. As the cylindrical electron beam enters the space between the output microwave electrodes 19, 21, the electron beam induces microwave voltages between the output electrodes and delivers microwave energy to the load circuit 23. Since the input and output microwave electric fields are substantially independent of each other, interaction therebetween is substantially eliminated. The microwave energy coupling between the input and output circuits is controlled as in the device of Fig. 1 by control or modulating potentials applied between the cathode and control grid electrodes of the electron gun. It also should be understood that the electron beam energy, and hence the coupling between the input and output microwave circuits may alternatively be controlled by varying the biasing potentials applied to one or all of the electron gun electrodes or to the collector electrode. However, the most effective coupling and modulation control is effected by applying the modulating or control potentials between the cathode or control grid of the electron gun.

The device of Figure 3 is similar in operation to that of Fig. 2 with the exception that the output electrodes 19, 21 comprise reentrant portions of a cavity resonator 25 having an upper central aperture 27 and a lower central aperture 29. The electron beam provided by the electron gun electrodes passes through the transverse microwave electric field established between the input electrodes 13, 15, and enters the cavity resonator 25 through the upper cavity resonator aperture 27. In traversing the transverse microwave electric field between the input electrodes 13, 15, the electrons of the beam assume spiral paths, as described heretofore. In passing through the region between the output electrodes 19, 21 within the cavity resonator 25, the spiral electron beam 17 induces microwave potentials in the output electrodes which cause the resonator 25 to resonate at the operating microwave frequency. In delivering energy to the output electrodes and the cavity resonator, the electron beam radius is reduced to small cross-sectional area and is collected by the collector electrode 11. A load circuit, not shown, is coupled into the cavity resonator 25 through a coaxial output transmission line 31 terminated in a coupling loop 33 within the resonator 25. The perspective view of the device shown in Fig. 4 illustrates more clearly the conformation and relative positioning of the input signal electrodes, the output signal electrodes within the resonator 25, and the collector electrode 11.

Referring to Figure 5, a third embodiment of the invention utilizes an electron beam gun and a collector electrode as described heretofore and an input microwave signal cavity resonator 37 and an output microwave signal cavity resonator 39 disposed coaxially with the axis of the electron beam intermediate the electron gun and the electron beam collector electrode. The microwave input signal resonator 37 may be of any known shape and preferably includes a pair of arcuate, oppositely-disposed capacitive field defining elements 41, 43 for establishing a concentrated microwave transverse electric field for imparting microwave rotational energy to the electron beam projected therethrough. The field establishing electrodes 41, 43 may be supported within the resonator by brackets 45, 47, respectively. The microwave input signal circuit may comprise a coaxial input transmission line 49 terminated within the resonator by a coupling loop 51. The electron beam enters the input signal resonator through an aperture 53, and the spirally traveling electrons leave the resonator through a second aperture 55.

The output microwave resonator 39 also may be of any desired shape and includes an input aperture 57 aligned with the output aperture 55 of the input resonator 37. The spirally-traveling electrons pass between a second group of field establishing electrodes 59, 61 supported within the output resonator 39 by brackets 63, 65, respectively, and leave the output resonator through an output aperture 67. The field establishing electrodes 59, 61 in the output resonator 39 preferably are rotated 90° with respect to the arrangement of the field defining elements 41, 43 of the input resonator in order completely to eliminate electromagnetic coupling between the cavities. As the spirally-traveling electrons pass between the field elements 59, 61 of the output resonator, they induce microwave voltages thereon which cause the output resonator 39 to resonate and abstract the rotational energy of the electron beam. The microwave output circuit may be coupled into the output resonator 39 through an output transmission line 69 terminated within the output resonator in an output coupling loop 71. The electron beam is collected by the collector electrode 11 after passing through the output resonator 39. The entire structure is enclosed within an evacuated envelope through which connections are provided for the various operating voltage and signal elements. The effective coupling between the input and output microwave circuits may be controlled, or the input signals may be amplitude modulated, by control or modulating signals applied between the cathode and control grid electrodes of the electron gun, or in any other manner, as described heretofore, whereby the axial energy of the electron beam is controlled.

Referring to Figures 6, 7 and 8, a second modification of the second embodiment of the invention employs means for providing a plurality of electron beams which are projected between a plurality of groups of beam deflecting vanes, and wherein the rotational energy of all of the electron beams is abstracted and coupled into a single output resonator coupled to a common microwave output circuit. A plurality of electron guns including cathodes 1, 1', etc., control grids 3, 3', etc., and anodes 7, 7', etc. are arranged above the spaces between alternately connected, radially extending vanes 75, 77, 79, 81, 83, 85, 87, 89. A microwave signal input circuit connected to vane connecting straps 91, 93 establishes transverse microwave electric fields between each pair of vanes, said fields imparting rotational microwave energy to the several electron beams. After passage through the transverse microwave fields, the spirally traveling electrons of the several electron beams pass between a plurality of microwave energy abstracting electrodes 19, 21 upon which are established microwave potentials and which abstract the rotational microwave energy of the several electron beams and establish an output microwave energy field within an output resonator 25. The output coupling elements 19 are provided by reentrant portions of the annular top wall 95 of the cavity resonator 25. The remaining output field electrodes 21 comprise vertically disposed elements supported adjacent each one of the reentrant elements 19 and supported upon a common flat support 97 which also may be the electron beam collector element. The collector element 97 is suitably positively biased and is insulated from the output resonator 25 by an insulating support 99.

The input microwave field establishing vanes 75, 77, etc. may or may not be telescoped within the resonator 25, as desired. If the elements are telescoped within the resonator, some objectionable interaction may occur between the input and output microwave circuits. However, in general, the coupling coefficient between the input and output microwave circuits will be determined principally by the axial energy of the electron beam as controlled by the modulating or control signals applied between the cathode and grid electrodes of all of the electron guns, and as a function of the initial beam intensity and velocity. Output microwave signals may be derived from an output coaxial line 31 coupled into the output resonator 25 through an output coupling loop 33 as in the device of Figures 3 and 4.

Referring to Figures 9, 10 and 11, a structure similar to a multicavity magnetron anode assembly may be employed in conjunction with a plurality of electron gun devices wherein each of the electron emitting cathodes 1 and associated electron gun electrodes are supported above the spaces between radially disposed deflecting electrodes 75, 77, 79, 81, 83, 85, 87 and 89. The electron beams directed through said spaces are subjected to transverse microwave electric fields whereby they absorb rotational microwave energy as described heretofore. Alternate ones of the radially disposed deflecting vanes are connected together adjacent their apices through two pairs of coaxially disposed connecting rings 91, 93 and 91', 93' on the upper and lower edges, respectively, of the deflecting vanes. The source of microwave signals 101 is connected to the upper pair of connecting rings 91, 93 for applying the input microwave signals to the deflecting vanes. The rotational energy absorbed by the electrons of the several electron beams projected through the transverse microwave electric fields causes each of the beams to form hollow expanding cones wherein each of the electrons thereof follow spiral paths as described heretofore.

After the cone shaped electron beams 17, 17', etc. pass through the transverse microwave fields between the deflecting vanes, they enter separate radially-disposed cavity resonators 105, 107, 109, 111, 113, 115, 117, 119 aligned below each of the deflecting spaces. The outer limits of the resonators are defined by the external envelope 121 of the device. The radial walls 127, 129, 131, 133, 135, 137, 139, 141 separating the several radially disposed resonators are aligned directly below the several deflecting vanes and spaced therefrom. Alternate ones of the radial walls of the resonators are connected together through upper and lower pairs of coaxial connecting rings 123, 125 and 123', 125' in the same manner as the deflecting vanes described heretofore. In passing through the several radially disposed cavity resonators the corresponding conical electron beams deliver energy to the several cavity resonators and lose substantially all of their rotational energy whereupon the beam assumes the shape, for example, of a hollow inverted cone. After passage through the resonators, the beams are collected by the common collector electrode 11. Output energy at the operating microwave frequency may be coupled to an external load, not shown, through a load line 31 coupled into one of the cavity resonators by a coupling loop 33. The degree of coupling between the input and output microwave circuits and the amplitude modulation of the microwave signals may be controlled between wide limits by control or modulating signals applied between the grid and cathode electrodes of each of the electron guns as described heretofore. The corresponding electrodes of all of the electron guns are shunt connected.

Referring to Figures 12, 13 and 14, a structure similar to that described by reference to Figs. 9, 10 and 11 differs therefrom in that a central, high power, thermionic cathode is provided in the upper or deflecting portion of the structure, the deflecting vanes are extended radially to the peripheral envelope 121 and an apertured shield 145 is provided between the upper cavity resonator elements and the lower cavity resonator elements, separate apertures 147 being provided for passage of the cone shaped electron beams therethrough. Otherwise, the structural details of the devices of Figs. 9, 10 and 11 and 12, 13 and 14 may be substantially identical except that no external source of microwave signals is required.

In operation, a source of high potential is connected between the central magnetron cathode 149 and the radially disposed multicavity magnetron anodes 75, 77, 79, 81, 83, 85, 87 and 89. The anodes are alternately connected together through upper and lower coaxial connecting rings 91, 93 as described heretofore. Due to the accelerating potential existing between the magnetron cathode 149 and its associated radially disposed magnetron cavity resonator anodes and the presence of an axial electromagnetic field 9, the upper portion of the device generates microwave oscillations of a frequency determined by the magnetron cavity resonator parameters and operating electrical and magnetic characteristics. Thus, transverse microwave electric fields are established between adjacent cavity resonator walls and the several auxiliary electron beams generated by the cathodes 1 and their associated electron gun structures are projected through the several cavity resonators of the magnetron structure. As the auxiliary electron beams progress through the magnetron cavity resonators, they absorb rotational microwave energy therefrom, the individual electrons are caused to travel in expanding spiral paths, and the several beams assume hollow expanding conical shapes.

The conical auxiliary electron beams pass through the apertures 147 in the shield 145 and enter the correspondingly aligned cavity resonators of the output structure disposed directly below the shielded apertures. The auxiliary electron beams thence deliver microwave energy to the several output cavity resonators, thus assuming, for example, contracting hollow conical conformation and are finally collected by the collector electrode 11. The microwave energy in the output cavity resonators may be applied to an external output load, not shown, through an output coupling loop 33 coupled into one of the output cavity resonators and connected to the load through an output coaxial line 31.

The device illustrated in Figs. 12, 13 and 14 has the advantage over that described by reference to Figs. 9, 10 and 11 in that it generates its own source of microwave energy which may be amplitude modulated by control or modulation input signals applied in shunt to the grid and cathode electrodes of the several auxiliary electron guns. Also the input and output microwave circuits are effectively shielded from each other by the shield 145 whereby the coupling therebetween is substantially independent of microwave leakage and substantially entirely dependent upon the axial energy of the several auxiliary electron beams.

Referring to Figures 15, 16, 17 and 18, a preferred modification of the third and preferred embodiment of the invention is quite similar to the structure described by reference to Fig. 5 but includes many additional details, not heretofore discussed.

The envelope 121 of the electron coupling device preferably is a metallic cylinder having annular end portions 151 and 153 hydrogen welded thereto. The input and output cavity resonators 37, 39 are supported within the cylindrical envelope 121, the input resonator 37 being conductively connected to or integral with the cylindrical envelope, and the output resonator 39 being insulated therefrom by insulating spacers 155 supported by the input resonator 37. A separate bias voltage connection 157 is provided through the envelope 121 to the walls of the output resonator 39. A first water jacket 159, having an input duct 161 and an output duct 163, is provided adjacent the middle of the cylindrical envelope. The collector electrode 11 is fitted into the center of the lower annular envelope section 153 and includes a second water jacket 165 having an input duct 167 and an output duct 169.

The cathode 1 is a hollow cylindrical shell having a coating of electron emissive material on the lower surface thereof and enclosing a heater element 171. The cathode is supported by a ring support 173 which provides correct spacing from the control grid 3 which is supported by a grid ring support 175. The cathode support 173, the control grid support 175, and the apertured screen grid ring 5 are supported by insulating spacers from the apertured anode 7 which provides the upper section of the input resonator 37. Separate leads to the cathode, heater, control grid and screen grid are provided through the seal 177. The anode 7 being connected to the metallic envelope 121 is grounded and maintained at a positive potential with respect to the cathode. Suitable lower bias potentials are applied to the screen grid, control grid and cathode.

The input coupling loop 51 terminates the inner conductor 179 of the input microwave coupling line 49 which includes a coaxial line termination comprising an inner coaxial line terminal 181, an insulator 183 and an outer coaxial line termination 185. The coupling loop 51 couples into the input resonator 37 adjacent to the spacing 187 between the arcuate electrodes 41 and 43 which are supported from the resonator walls by the brackets 45, 47, respectively. The input resonator 37 is tuned by an adjustable capacitive element 189 which is adjustably spaced from the resonator electrodes 41, 43 adjacent the opposite aperture 191. The spacing of the first resonator tuning element 187 may be adjusted from outside of the tube envelope by a threaded control shaft 193 which actuates the tuning element 189 through a Sylphon joint 195. A ball bearing assembly 197 is provided for the inner end of the threaded control shaft 193. A window 199 sealed into the coupler envelope 121 adjacent to the lower portion of the input resonator 37 provides means for visually observing inner operating temperatures and possible ionization.

The output resonator 39 includes an output coupling loop 71 of similar construction to the input coupling loop 51 and coupled to a load, not shown, through an output coaxial transmission line 69. The inner transmission line conductor termination 201, insulator 203 and outer coaxial line termination 205 are similar in construction to the terminations 181, 183, 185 of the input microwave coaxial line. It is noted that the inner and outer transmission line termination conductors are tapered in the region adjacent to the tube envelope for the purpose of minimizing wave discontinuities and wave reflections therein.

The arcuate electrodes 59, 61 in the output cavity resonator 39 are supported from the cavity resonator walls by the brackets 63, 65, respectively, and the apertures 207, 209 therebetween are disposed at right angles to the apertures 185, 189 between the electrodes of the input resonator.

A second tuning unit 211 is provided for the electrodes 59, 61 of the output resonator 39 and is located adjacent to the gap 209 between the resonator electrodes. The tuning element 211 is actuated by a second threaded tuning control shaft 213 located outside of the envelope 121 and coupled thereto through a second Sylphon joint 215 actuated through a second ball bearing assembly 217.

In operation, suitable bias potentials are applied to the control electrode, screen grid and anode electrodes, as well as to the collector electrode which is maintained at the same potential as the anode, whereby the desired electron beam velocity and initial intensity is provided. If desired, the potential applied to the output resonator 39 may differ from that applied to the tube envelope and the input resonator. Preferably, the modulation or control signals are applied to the coupling device between the cathode and control grid of the electron gun, thereby providing maximum modulation sensitivity. However, as described heretofore, the modulation of the microwave signals applied to the device may be alternatively controlled by varying any of the other electron beam operating voltages in accordance with the desired modulation or control signals.

The tuning elements 189 and 211 are adjusted to resonate the input and output resonators at the operating microwave frequency to provide maximum coupling efficiency for the particular load conditions encountered. The specific structure described by reference to Figs. 15 to 18 provides a convenient microwave coupler for microwave energies exceeding 1 kilowatt at an operating frequency range of 700 to 800 megacycles. The structure may be modified in accordance with known techniques for other operating microwave frequency ranges and power ratings.

Thus the invention described and claimed herein comprises novel methods of and means for transforming microwave energy and for controlling or amplitude-modulating the transformed microwave signals. Various embodiments and modifications of the invention include systems utilizing either single cavity or multi-cavity input and output microwave resonators, as well as magnetron means for generating the desired microwave signals within the microwave coupler structure. Various methods are disclosed and suggested for controlling the modulation of the microwave signals.

I claim as my invention:

1. A microwave device including means for generating an electron beam, means for establishing a unidirectional magnetic field substantially parallel with the axis of said generated beam, means for establishing a microwave electric field transverse to the axis of said beam for causing the electrons of said beam to traverse spiral paths having radii dependent upon the energy absorbed by said electrons from said electric field, means separate from said electric field establishing means and coupled to said beam for abstracting microwave energy from said beam, and means for controlling the energy of said beam to control the magnitude of said abstracted energy.

2. A microwave amplitude modulation device including means for generating an electron beam, means for establishing a unidirectional magnetic field substantially parallel with the axis of said generated beam, means for establishing a microwave electric field transverse to the axis of said beam for causing the electrons of said beam to traverse spiral paths having radii dependent upon the energy absorbed by said electrons from said electric field, means separate from said electric field establishing means and coupled to said beam for abstracting microwave energy from said beam, a source of modulation signals, and means responsive to said modulation signals for controlling the energy of said beam to modulate the amplitude of said abstracted energy.

3. A microwave coupling device including means for generating an electron beam, means for subjecting said beam to an axial magnetic field, means for establishing a transverse microwave electric field, means for subjecting said beam to said transverse microwave electric field to cause electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and means for adjusting the electron density of said beam to effectively control the microwave coupling between said field establishing means and said utilization means.

4. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and means for adjusting the axial electron velocity of said beam to effectively control the mocrowave coupling between said field establishing means and said utilization means.

5. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and means for adjusting the initial energy of said beam to effectively control the microwave coupling between said field establishing means and said utilization means.

6. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and means for adjusting the total energy of said beam to effectively control the microwave coupling between said field establishing means and said utilization means.

7. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and adjustable acceleration potential means for adjusting the axial electron velocity of said beam to effectively control the microwave coupling between said field establishing means and said utilization means.

8. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and adjustable bias control means operable upon said beam generating means for adjusting the electron density of said beam to effectively control the microwave coupling between said field establishing means and said utilization means.

9. A microwave coupling device including means for generating an electron beam, means for subjecting said beam to an axial magnetic field, means for establishing a transverse microwave electric field, means for subjecting said beam to said transverse microwave electric field to cause the electrons of said beam to follow spiral paths having radii dependent upon the energy absorbed by said electrons from said electric field, means separate from said electric field establishing means and disposed adjacent to the path of said beam for abstracting microwave energy from said beam thereby causing a reduction in the radii of the electron paths of said beam, means for utilizing said abstracted microwave energy, and means for adjusting the electron density of said beam to control the microwave coupling between said field establishing means and said utilization means.

10. A microwave coupling device including means for generating an electron beam, means for subjecting said beam to an axial magnetic field, means for establishing a microwave electric field, means for subjecting said beam to said electric field to cause the electrons of said beam to follow spiral paths having radii dependent upon the energy absorbed by said electrons from said electric field, a pair of electrodes disposed adjacent to the path of said beam whereby said beam generates a second microwave field between said electrodes, a load circuit coupled to said electrodes whereby energy absorbed by said field between said electrodes causes a reduction in the radii of the electrons of said beam passing between said electrodes, a collector element for said beam after passage between said electrodes, and means for adjusting the electron energy of said beam to effectively control the microwave coupling between said field establishing means and said load circuit.

11. A microwave coupling device including means for generating an electron beam, means for subjecting said beam to an axial magnetic field, means for establishing a microwave electric field, means for subjecting said beam to said electric field to cause the electrons of said beam to follow spiral paths having radii dependent upon the energy absorbed by said electrons from said electric field, a pair of electrodes disposed adjacent to the path of said beam whereby said beam generates a second microwave field between said electrodes, a load circuit coupled to said electrodes whereby energy absorbed by said second field causes a reduction in the radii of the electrons of said beam passing between said electrodes, a collector element for said beam after passage between said electrodes, operating voltage means for said beam generating means and said collector element, and means for adjusting said voltage means to effectively control the microwave coupling between said field establishing means and said load circuit.

12. A microwave coupling device including means for generating an electron beam, means for subjecting said beam to an axial magnetic field, means including a first pair of electrodes for establishing a microwave electric field transversely to the axis of said beam and said magnetic field, means for subjecting said beam to said electric field to cause the electrons of said beam to follow spiral paths having radii dependent upon the energy absorbed by said electrons from said electric field, a second pair of electrodes disposed adjacent to the path of said beam whereby said beam generates a second microwave field between said electrodes, a load circuit coupled to said second microwave field whereby energy absorbed by said second field causes a reduction in the radii of the electrons of said beam passing between said electrodes, a collector element for said beam after passage between said electrodes, and means for adjusting the electron energy of said beam to effectively control the microwave coupling between said field establishing means and said load circuit.

13. A microwave coupling device including means for generating an electron beam, means for subjecting said beam to an axial magnetic field, means for establishing a microwave electric field, means for subjecting said beam to said electric field to cause the electrons of said beam to follow spiral paths having radii dependent upon the energy absorbed by said electrons from said electric field, a pair of electrodes disposed adjacent to the path of said beam whereby said beam generates a second microwave field between said electrodes, a load circuit coupled to said electrodes whereby energy absorbed by said electrodes causes a reduction in the radii of the electrons of said beam passing between said electrodes, a collector element for said beam after passage between said electrodes, and means for adjusting the electron density of said beam to control the microwave coupling between said field establishing means and said load circuit.

14. A microwave coupling device including means for generating an electron beam, means for subjecting said beam to an axial magnetic field, means including a first pair of electrodes for establishing a microwave electric field transverse to the axes of said beam and said magnetic field, means for subjecting said beam to said electric field to cause the electrons of said beam to follow spiral paths having radii dependent upon the energy absorbed by said electrons from said electric fie'd, a second pair of electrodes disposed perpendicular to said first electrodes adjacent to the path of said beam whereby said beam generates a second microwave field between said electrodes, a load circuit coupled to said second microwave field whereby energy absorbed by said second field causes a reduction in the radii of the electrons of said beam passing between said second electrodes, a collector element for said beam after passage between said electrodes, and means for adjusting the electron energy of said beam to effectively control the microwave coupling between said field establishing means and said load circuit.

15. A microwave coupling device including means for generating an electron beam, means for subjecting said beam to an axial magnetic field, means including a first pair of electrodes for establishing a microwave electric field transverse to the axes of said beam and said magnetic field, means for subjecting said beam to said electric field to cause the electrons of said beam to follow spiral paths having radii dependent upon the energy absorbed by said electrons from said electric field, a second pair of electrodes disposed in the same planes as said first pair of electrodes and axially displaced along and adjacent to the path of said beam whereby said beam generates a second microwave field between said electrodes, a load circuit coupled to said second field whereby energy absorbed by said second field causes a reduction in the radii of the electrons of said beam passing between said electrodes, a collector element for said beam after passage between said electrodes, and means for adjusting the electron energy of said beam to effectively control the microwave coupling between said field establishing means and said load circuit.

16. A microwave coupling device including a thermionic cathode, a control grid and an anode electrode for generating an electron beam, means for generating a unidirectional magnetic field substantially coaxial with said beam, means for subjecting said beam to said axial magnetic field, means for establishing a microwave electric field transverse to the axis of said beam, means for projecting said beam through said electric field to cause the electrons of said beam to follow spiral paths having radii dependent upon the energy absorbed by said electrons from said electric field, a pair of output electrodes disposed adjacent to the path of said beam, a cavity resonator surrounding said electrodes whereby said beam generates a second microwave field in said resonator and between said output electrodes thus abstracting microwave energy from said beam, a load circuit coupled into said resonator whereby said energy abstracted from said beam causes a reduction in the radii of the paths of the electrons of said beam passing between said output electrodes, a collector element for said beam after passage through said resonator, and means for adjusting the electron energy of said generated beam to effectively control the microwave coupling between said transverse field establishing means and said load circuit.

17. A microwave coupling device including a thermionic cathode, a control grid and an anode electrode for generating an electron beam, means for generating a unidirectional magnetic field substantially coaxial with said beam, means for subjecting said beam to said axial magnetic field, a first group of electrodes for establishing a microwave electric field transverse to the axis of said beam, means for projecting said beam through said electric field to cause the electrons of said beam to follow spiral paths having radii dependent upon the energy absorbed by said electrons from said electric field, a second group of output electrodes telescoped between said first group of electrodes and disposed adjacent to the path of said beam, a cavity resonator surrounding said second group of electrodes whereby said beam generates a second microwave field in said resonator and between said second group of output electrodes thus abstracting microwave energy from said beam, a load circuit coupled into said resonator whereby said energy abstracted from said beam causes a reduction in the radii of the paths of the electrons of said beam passing between said output electrodes, a collector element for said beam after passage through said resonator, and means for adjusting the electron energy of said generated beam to effectively control the microwave coupling between said transverse field establishing means and said load circuit.

18. A microwave coupling device including a thermionic cathode, a control grid and an anode electrode for generating an electron beam, means for generating a unidirectional magnetic field substantially coaxial with said beam, means for subjecting said beam to said axial magnetic field, means for establishing a microwave electric field transverse to the axis of said beam, means for projecting said beam through said electric field to cause the electrons of said beam to follow spiral paths having radii dependent upon the energy absorbed by said electrons from said electric field, a cavity resonator including oppositely disposed reentrant wall portions forming a pair of output electrodes disposed adjacent to the path of said beam whereby said beam generates a second microwave field in said resonator and between said output electrodes thus abstracting microwave energy from said beam, a load circuit coupled into said resonator whereby said energy abstracted from said beam causes a reduction in the radii of the paths of the electrons of said beam passing between said output electrodes, a collector element for said beam after passage through said resonator, and means for adjusting the initial electron energy of said generated beam to effectively control the microwave coupling between said transverse field establishing means and said load circuit.

19. A microwave coupling device including means for generating an electron beam, means for establishing a unidirectional magnetic field substantially coaxial with said generated beam, a first cavity resonator having disposed therein a pair of electrodes for establishing a microwave electric field transverse to said axis of said beam for causing the electrons of said beam to traverse spiral paths having radii dependent upon the energy absorbed by said electrons from said electric field, a second cavity resonator having disposed therein a second pair of electrodes adjacent to the path of said beam for abstracting energy from said beam, a load circuit coupled to said second resonator, and means for controlling the energy of said beam to effectively control the coupling between said resonators.

20. A microwave coupling device including a thermionic cathode, a control grid and an anode for generating an electron beam, means for establishing a unidirectional magnetic field substantially coaxial with said generated beam, a first cavity resonator having disposed therein a pair of electrodes for establishing a microwave electric field transverse to said axis of said beam for causing the electrons of said beam to traverse spiral paths having radii dependent upon the energy absorbed by said electrons from said electric field, a second cavity resonator having disposed therein a second pair of electrodes adjacent to the path of said beam for abstracting energy from said beam, a load circuit coupled to said second resonator, and adjustable operating voltage means for said control grid for controlling the energy of said beam to effectively control the coupling between said resonators.

21. A microwave coupling device including means comprising a thermionic cathode, a control electrode and an anode for generating an electron beam, means for establishing a unidirectional magnetic field substantially coaxial with said generated beam, a first cavity resonator having disposed therein a pair of electrodes for establishing a microwave electric field transverse to said axis of said beam for causing the electrons of said beam to traverse spiral paths having radii dependent upon the energy absorbed by said electrons from said electric field, a second cavity resonator having disposed therein a second pair of electrodes adjacent to the path of said beam for abstracting energy from said beam, a load circuit coupled to said second resonator, and adjustable operating voltage means for said beam generating means for controlling the energy of said beam to effectively control the coupling between said resonators.

22. A microwave coupling device including means for generating an electron beam, means for establishing a unidirectional magnetic field substantially coaxial with said generated beam, a first cavity resonator having disposed therein a pair of electrodes for establishing a microwave electric field transverse to said axis of said beam for causing the electrons of said beam to traverse spiral paths having radii dependent upon the energy absorbed by said electrons from said electric field, a second cavity resonator having disposed therein a second pair of electrodes adjacent to the path of said beam for abstracting energy from said beam, collecting means for said beam after passage through said second resonator, a load circuit coupled to said second resonator, and adjustable voltage means for said collecting means for controlling the energy of said beam to effectively control the coupling between said resonators.

23. A microwave coupling device including means for generating an electron beam, means for establishing a unidirectional magnetic field substantially coaxial with said generated beam, a first cavity resonator having disposed therein a pair of arcuate electrodes for establishing a microwave electric field transverse to said axis of said beam for causing the electrons of said beam to traverse spiral paths having radii dependent upon the energy absorbed by said electrons from said electric field, a second cavity resonator coaxial with said first resonator having disposed therein a second pair of arcuate electrodes adjacent to the path of said beam for abstracting energy from said beam, a load circuit coupled to said second resonator, and means for controlling the energy of said beam to effectively control the coupling between said resonators.

24. Apparatus according to claim 23 wherein said second pair of electrodes are perpendicularly displaced with respect to said first pair of electrodes, the surfaces of all of said electrodes being substantially parallel to the axis of said beam.

25. A microwave coupling device including means for generating an electron beam, means for establishing a unidirectional magnetic field substantially coaxial with said generated beam, a first cavity resonator having disposed therein a pair of electrodes for establishing a microwave electric field transverse to said axis of said beam for causing the electrons of said beam to traverse spiral paths having radii dependent upon the energy absorbed by said electrons from said electric field, a second cavity resonator having disposed therein a second pair of electrodes adjacent to the path of said beam for abstracting energy from said beam, an electrostatic shield between said resonators, said shield being apertured for passage of said electron beam, a load circuit coupled to said second resonator, and means for controlling the energy of said beam to effectively control the coupling between said resonators.

26. Apparatus according to claim 25 including capacitive tuning means for the electrodes in one of said resonators, said means being operable from outside of said device.

27. A microwave coupling device including a plurality of means for generating a plurality of electron beams, means for establishing a unidirectional magnetic field substantially parallel with the axes of said generated beams, a first group of radially disposed elements each disposed adjacent to the path of one of said beams for establishing microwave electric fields transverse to the axes of said beams for causing the electrons of each of said beams to traverse spiral paths having radii dependent upon the energy absorbed by said electrons from said electric fields, a second group of radially disposed cavity resonators each disposed adjacent to the path of one of said beams for abstracting energy from said beams, a load circuit coupled to at least one of said second resonators, and means for controlling simultaneously the energy of all of said beams to effectively control the coupling between said groups of resonators.

28. A microwave coupling device including a plurality of means for generating a plurality of electron beams, means for establishing a unidirectional magnetic field substantially parallel with the axes of said generated beams, a first group of radially disposed cavity resonators each disposed in the path of one of said beams for establishing microwave electric fields transverse to the axes of said beams for causing the electrons of each of said beams to traverse spiral paths having radii dependent upon the energy absorbed by said electrons from said electric fields, a second group of radially disposed cavity resonators each disposed adjacent to the path of one of said beams for abstracting energy from said beams, means coupling together the individual resonators of each of said groups of resonators, a load circuit coupled to at least one of said second resonators, and means for controlling simultaneously the energy of all of said beams to effectively control the coupling between said groups of resonators.

29. A microwave coupling device including a plurality of means for generating a plurality of electron beams, means for establishing a unidirectional magnetic field substantially parallel with the axes of said generated beams, a first group of radially disposed cavity resonators each disposed in the path of one of said beams for establishing microwave electric fields transverse to the axes of said beams for causing the electrons of each of said beams to traverse spiral paths having radii dependent upon the energy absorbed by said electrons from said electric fields, a second group of radially disposed cavity resonators each disposed adjacent to the path of one of said beams for abstracting energy from said beams, conductive strapping means coupling together alternate radial elements of the individual resonators of each of said groups of resonators, a load circuit coupled to at least one of said second resonators, and means for controlling simultaneously the energy of all of said beams to effectively control the coupling between said groups of resonators.

30. A microwave coupling device including a plurality of means for generating a plurality of electron beams, means for establishing a unidirectional magnetic field substantially parallel with the axes of said generated beams, a first group of radially disposed cavity resonators each disposed in the path of one of said beams, a source of microwave energy coupled to one of said resonators for establishing microwave electric fields in said resonators transversely to the axes of said beams for causing the electrons of each of said beams to traverse spiral paths having radii dependent upon the energy absorbed by said electrons from said electric fields, a second group of radially disposed cavity resonators each disposed adjacent to the path of one of said beams for abstracting energy from said beams, means coupling together the individual resonators of each of said groups of resonators, a load circuit coupled to at least one of said second resonators, and means for controlling simultaneously the energy of all of said beams to effectively control the coupling between said groups of resonators.

31. Apparatus according to claim 30 including collecting means for collecting said electron beams after passage through said second group of resonators.

32. A microwave coupling device including a plurality of means for generating a plurality of electron beams, means for establishing a unidirectional magnetic field substantially parallel with the axes of said generated beams, a first group of radially disposed cavity resonators each disposed in the path of one of said beams, a thermionic cathode on the central axis of said first group of resonators, operating voltage means connected between said cathode and said resonators for generating microwave oscillations in said resonators and for establishing microwave electric fields in said resonators transversely to the axes of said beams for causing the electrons of each of said beams to traverse spiral paths having radii dependent upon the energy absorbed by said electrons from said electric fields, a second group of radially disposed cavity resonators each disposed adjacent to the path of one of said beams for abstracting energy from said beams, means coupling together the individual resonators of each of said groups of resonators, a load circuit coupled to at least one of said second resonators, and means for controlling simultaneously the energy of all of said beams to effectively control the coupling between said groups of resonators.

33. Apparatus according to claim 32 including electrostatic shielding means disposed between said resonators, said shielding means being apertured for passage of said beams.

34. A microwave device according to claim 1, wherein the frequency of said microwave electric field is substantially equal to $$\frac{1}{2\pi}\frac{e}{m}H$$

where $e$ and $m$ are the charge and mass, respectively, of an electron and $H$ is the intensity of said magnetic field.

35. A microwave device including means for generating an electron beam, means for establishing a unidirectional magnetic field substantially parallel with the axis of said generated beam, means for establishing a microwave electric field transverse to the axis of said beam for causing the electrons of said beam to traverse spiral paths having radii dependent upon the energy absorbed by said electrons from said electric field, means separate from said electric field establishing means and coupled to said beam for abstracting microwave energy from said beam, and means for controlling the coupling between said electric field establishing means and said energy absorbing means.

36. A microwave device including means for generating an electron beam, means for establishing a unidirectional magnetic field substantially parallel with the axis of said generated beam, means for establishing a microwave electric field transverse to the axis of said beam for causing the electrons of said beam to traverse spiral paths having radii dependent upon the energy absorbed by said electrons from said electric field, means separate from said electric field establishing means and coupled to said beam for abstracting microwave energy from said beam, and means for controlling the amount of energy absorbed by said energy abstracting means from said beam.

37. A microwave coupling device including means for generating a plurality of spaced parallel electron beams for establishing a unidirectional magnetic field substantially parallel to said beams, means for establishing a microwave electric field transverse to each beam for causing the electrons of each of the beams to traverse spiral paths having radii dependent upon the energy absorbed by said electrons from said electric field, means separate from said electric field establishing means and coupled to each of said beams for abstracting microwave energy therefrom, and means for controlling simultaneously the energy of all of said beams to effectively control the coupling between said electric field establishing means and said energy abstracting means.

38. An electron discharge device including electron gun means for generating an electron beam along a predetermined path, means for establishing a unidirectional magnetic field substantially parallel with said path, first electrode means adjacent said path for establishing an alternating electric field transverse to said path for causing the electrons of said beam to traverse spiral paths having radii dependent upon the energy absorbed by said electrons from said electric field, second electrode means, adjacent said path and separate from said first electrode means, for abstracting energy from said beam, and other electrode means positioned in the path of said beam and adapted to have a modulating potential applied thereto for varying the beam coupling between said first and second electrode means.

39. An electron discharge device according to claim 38, wherein said last-named means comprises a grid positioned adjacent said beam generating means and adapted to vary the electron density of said beam.

40. An electron discharge device according to claim 38, wherein said last-named means comprised an apertured accelerating electrode surrounding said beam path and adapted to vary the axial electron velocity of said beam.

41. An electron discharge device including an elongated envelope, electron gun means within one end of said envelope for generating an electron beam along the longitudinal axis thereof, means for establishing an axial magnetic field along said beam, a first pair of electrodes on opposite sides of the beam path and adapted to be connected to an external source for establishing an alternating electric field transverse to said path for causing the electrons of said beam to traverse spiral paths having radii dependent upon the energy absorbed by said electrons from said electric field, a second pair of electrodes spaced from said first pair and positioned on opposite sides of said path and adapted to be connected to a load circuit for abstracting energy from said beam, and electrode means positioned in the path of said beam and adapted to have a modulating potential applied thereto for varying the beam coupling between said first and second pairs of electrodes.

42. An electron discharge device according to claim 41, further including a first cavity resonator coupled between the electrodes of said first pair, and a second cavity resonator coupled between the electrodes of said second pair.

43. An electron discharge device according to claim 42, further including an electrostatic shield between said resonators.

CARMEN L. CUCCIA.

REFERENCES CITED

The following references are of record in the file of this patent:

UNITED STATES PATENTS

| Number | Name | Date |
|---|---|---|
| 2,206,668 | Hollmann | July 2, 1940 |
| 2,270,777 | Baeyer | Jan. 20, 1942 |
| 2,381,539 | Hartley | Aug. 7, 1945 |
| 2,395,647 | Strobel | Feb. 26, 1946 |
| 2,409,222 | Morton | Oct. 15, 1946 |
| 2,435,601 | Ramo | Feb. 10, 1948 |